United States Patent [19]

Muto et al.

[11] Patent Number: 5,371,608
[45] Date of Patent: Dec. 6, 1994

[54] OPTICAL SCAN APPARATUS HAVING JITTER AMOUNT MEASURING MEANS

[75] Inventors: Kenji Muto, Kawasaki; Masayuki Suzuki, Hadano; Yoshinobu Shiraiwa, Machida, all of Japan

[73] Assignee: Canon Kabushiki Kaisha, Tokyo, Japan

[21] Appl. No.: 43,931

[22] Filed: Apr. 8, 1993

[30] Foreign Application Priority Data

Apr. 10, 1992 [JP] Japan ............... 4-118395

[51] Int. Cl.⁵ ............................................. H04N 1/36
[52] U.S. Cl. .................................... 358/412; 358/481;
358/474; 358/296; 250/236
[58] Field of Search ............... 358/481, 480, 474, 471,
358/296, 406, 412, 409; 359/216, 217, 218, 219;
250/235, 236; 235/467, 462, 472

[56] References Cited

U.S. PATENT DOCUMENTS

| | | | |
|---|---|---|---|
| 4,616,132 | 10/1986 | Kessler | 358/481 |
| 4,761,660 | 8/1988 | Lee | 358/480 |
| 4,831,247 | 5/1989 | Ishizaka | 358/481 |
| 4,950,888 | 8/1990 | Hamada | 359/218 |
| 5,115,121 | 5/1992 | Bianco et al. | 235/467 |

*Primary Examiner*—Richard Hjerpe
*Assistant Examiner*—Fan Lee
*Attorney, Agent, or Firm*—Fitzpatrick, Cella, Harper & Scinto

[57] ABSTRACT

A scan optical apparatus is provided with a first light source for generating a beam for scan optically modulated based on an image signal, a second light source for generating a beam for jitter amount detection, a scanning device for deflecting the beams from the first light source and from the second light source to scan a surface to be scanned, an optical member disposed in the vicinity of the surface to be scanned or at a position substantially optically equivalent to the surface to be scanned, and a detecting device for detecting a beam reflected by the optical member and deflected by the scanning device. The optical member may have reflective portions and nonreflective portions which are repeatedly arranged in a main scan direction, or may be a corner cube array in which a plurality of corner cubes are arranged in the main scan direction. Further, the surface to be scanned may be a recording medium in a recording apparatus.

38 Claims, 5 Drawing Sheets

MAIN SCANNING DIRECTION

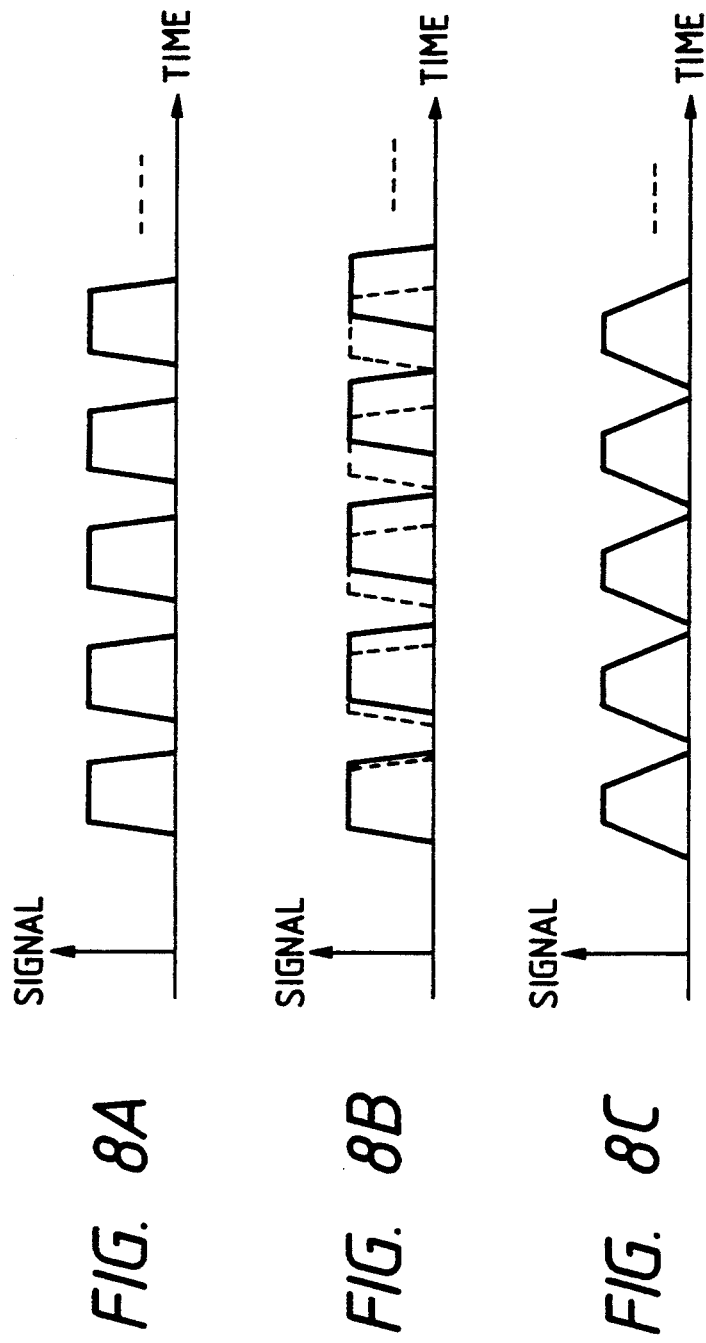

OPTICAL SCAN APPARATUS HAVING JITTER AMOUNT MEASURING MEANS

BACKGROUND OF THE INVENTION

1. Field of the Invention

The present invention relates to an optical scan apparatus having jitter amount measuring means. More particularly, the invention relates to an optical scanner with jitter amount measuring means capable of measuring scan unevenness, which could be caused by production errors of light deflector being a constituent of scan optical system and by drive errors of motor driving the light deflector, at a high precision in optically scanning a surface to be scanned, whereby the optical scanner can correct the scan unevenness to enable high precision optical scan, and, therefore, which may be suitably applicable for example to a scan optical system in a laser beam printer (LBP) or in an image reading apparatus.

2. Related Background Art

Conventionally, an optical beam (as also called as an optical flux) emitted from a laser source is optically modulated according to an image signal in a scan optical system used for example in LBP. The thus optically modulated beam passes for example through a collimator lens and a cylindrical lens, and is then deflected by a light deflector comprising a rotary polygon mirror. The deflected beam is converged through an f-θ lens system to form a spot on a surface of photosensitive recording medium, and the medium surface is optically scanned with the spot beam, whereby an image is recorded.

The scan optical system often has scan unevenness risen from a difference in scan time for each scan line and a scan position deviation in the main (horizontal) scan direction in optically scanning a surface to be scanned because of the manufacturing errors of light deflector being a constituent of the scan optical system and the drive errors of motor driving the light deflector, whereby a quality of image could be degraded. (The scan unevenness and the scan position deviation will be referred to as "jitter.")

There are various proposals of scan optical system which can optically scan a surface to be scanned at a high precision by measuring a jitter amount (amount of scan unevenness) by means of jitter amount measuring means.

An example is described in G. Toyen, "Generation of Precision Pixel Clock in Laser Printers and Scanners," SPIE, vol 84 (1976), in which two optical beams are used, one of which is used as a scanning light beam for optically scanning the surface to be scanned, and the other of which is as an optical beam for detecting a jitter amount (as a detecting light beam).

The detecting light beam is guided to enter a grating plate, which is disposed on a surface optically equivalent to the surface to be scanned and which has a plurality of grating lines arranged at predetermined intervals. The grating plate is optically scanned with the detecting light beam to obtain a pulse light signal. The pulse light signal from the grating plate is guided through a condensing means to a photo detector to produce a sychronizing signal. Then, the optical scan is carried out while controlling a light emission timing of the scan optical beam emitted from light source means for image recording, based on the synchronizing signal.

Another example is disclosed in Japanese Laid-open Patent Application No. 2-277018, in which an optical beam for detection is used for scan along a reference grating plate disposed at a position optically equivalent to a surface to be scanned with a scanning light beam so as to obtain a pulse light signal, the light signal is guided through an optical fiber bundle and a light waveguide member to a photo detector to produce a synchronizing signal, and the surface to be scanned is scanned based on the synchronizing signal to effect reading or recording of image or the like.

Still another example is disclosed in Japanese Laid-open Patent Application No. 2-106715, in which an optical beam is used for scan along a grating disposed on a plane optically equivalent to a surface to be scanned to obtain a pulse light signal, the light signal is guided to light detecting means comprised of a lens array and a plurality of light receiving elements to produce a synchronizing signal, and the surface to be scanned is scanned based on the synchronizing signal to effect image recording.

In the example as disclosed in the above Japanese Application, the reference pulse signal is obtained from the optical beam emitted from a semiconductor laser for synchronous detection, the reference pulse signal is input into a PLL (phase-locked loop) circuit, a light emission power of the optical beam from the semiconductor laser for synchronous detection is detected, and the light emitting power of the optical beam from the semiconductor laser is controlled by control means to obtain a better synchronizing signal.

In these conventional optical scanning apparatuses, the photo detector for producing the synchronizing signal needed numerous lenses and light receiving elements to pick up optical beams transmitted through the grating plate over the entire scan width. Such an arrangement increased the number of parts and made the entire apparatus complicated, making a reduction in cost of production difficult.

Further problems are such that adjustment of arrangement of such optical members is very difficult and that the entire apparatus is made larger in size and complex in arrangement.

SUMMARY OF THE INVENTION

It is an object of the present invention to provide an optical scan apparatus having jitter amount measuring means in which light source means for synchronous detection, a light deflector, an optical member, and photo detecting means are properly arranged, which can measure a jitter amount at a high precision without necessity of great modification of the conventional scan optical system and without making the entire apparatus complicated, and which can optically scan a surface to be scanned at a high precision.

An optical scan apparatus having jitter amount measuring means according to the present invention is characterized in that while an optical beam for scan optically modulated based on an image signal is guided by first light guiding means to a deflection facet of a light deflector and then deflected by the deflection facet to go through imaging means to a surface to be scanned thereby to perform optical scan, an optical beam for detecting a jitter amount is guided by second light guiding means to the deflection facet of the light deflector, the detecting optical beam is deflected by the deflection facet then to pass through the imaging means to enter an optical member having reflective portions and nonreflective portions arranged in the vicinity of the surface to be scanned or at a position substantially optically equivalent to the surface to be scanned, photo detecting means detects beams having passed through the imaging means and then reflectively deflected on a deflection facet adjacent to the aforementioned deflection facet of the light deflector out of beams reflected by the reflective portions, and a jitter amount is detected based on a signal obtained by the photo detecting means.

Another optical scan apparatus having jitter amount measuring means according to the present invention is characterized in that while a first optical beam for scan optically modulated based on an image signal is guided by first light guiding means to a deflection facet of a light deflector and then deflected by the deflection facet to go through imaging means to a surface to be scanned thereby to perform optical scan, a second optical beam is guided by second light guiding means to the deflection facet of the light deflector, the second optical beam is deflected by the deflection facet to pass through the imaging means then to enter a reflection type grating disposed in the vicinity of the surface to be scanned or at a position substantially optically equivalent to the surface to be scanned and having a plurality of grating lines at predetermined intervals in a main scan direction, photo detecting means detects beams having passed through the imaging means and then reflectively deflected by a deflection facet adjacent to the aforementioned deflection facet of the light deflector out of beams reflected by the reflective portions, and a jitter amount is detected based on a signal obtained by the photo detecting means.

Still another optical scan apparatus having jitter amount measuring means according to the present invention is characterized in that while a first optical beam optically modulated based on an image signal is guided by first light guiding means to a deflection facet of a light deflector and deflected by the deflection facet to go through imaging means to a surface to be scanned thereby to perform optical scan, a second optical beam is guided by second light guiding means to the deflection facet of the light deflector, the second optical beam is deflected by the deflection facet to pass through the imaging means then to enter a corner cube array disposed in the vicinity of the surface to be scanned or at a position substantially optically equivalent to the surface to be scanned and having a plurality of corner cubes arranged in a main scan direction, the second optical beam then passes again through the imaging means to go to the deflection facet of the light deflector, the second optical beam is reflectively deflected by the deflection facet then to enter photo detecting means via a half mirror constituting a part of the second light guiding means, and a jitter amount is detected based on a signal obtained by the photo detecting means.

BRIEF DESCRIPTION OF THE DRAWINGS

FIG. 8A, FIG. 8B, and FIG. 8C are illustrations to respectively show an output signal from a photo detector in the third embodiment of the present invention.

DETAILED DESCRIPTION OF THE PREFERRED EMBODIMENTS

Figure 1:
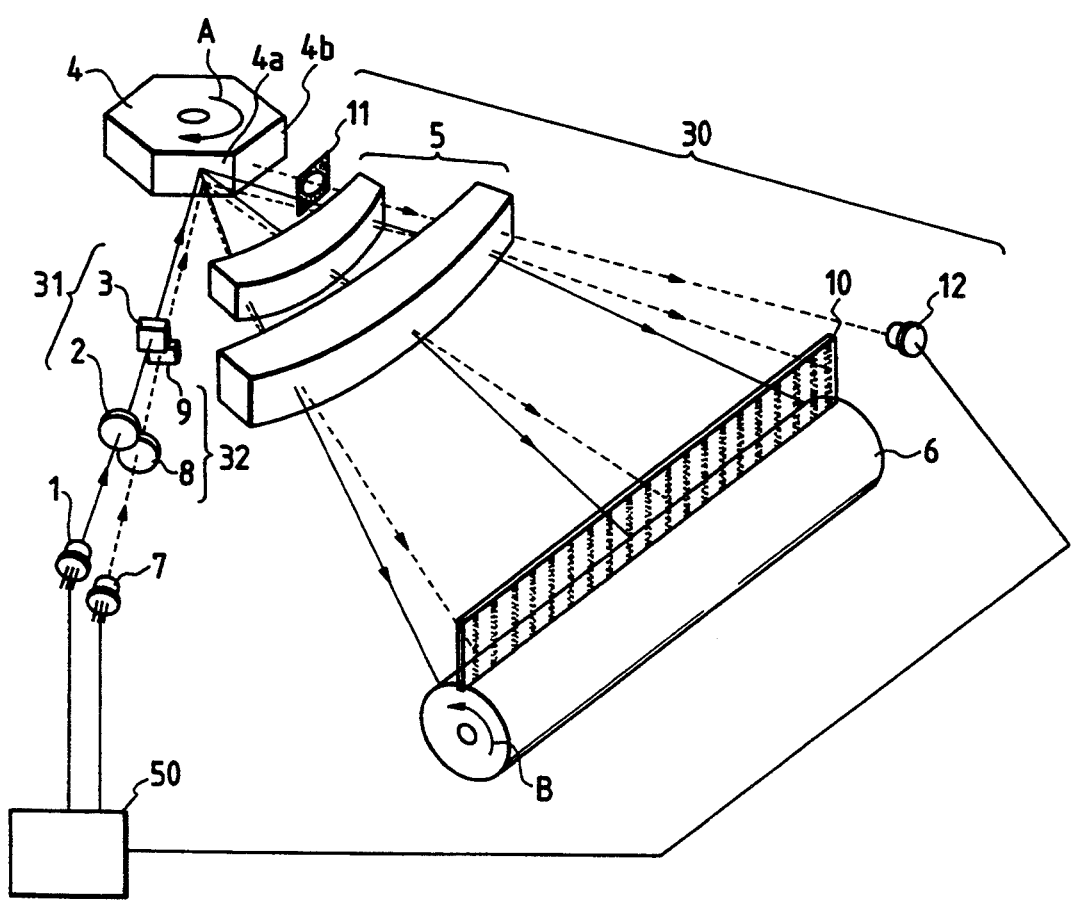
FIG. 1 is a schematic drawing of main part of an optical system in a first embodiment of the present invention.

FIG. 1 is a main part schematic drawing of an optical system in a first embodiment of the present invention. In FIG. 1, reference numeral 1 designates light source means for image recording, which comprises a semiconductor laser emitting a scanning light beam (first optical beam) for image recording.

Numeral 2 denotes a collimator lens, which collimates the scanning light beam emitted from the semiconductor laser 1 to obtain a substantially parallel optical beam. Numeral 3 is a cylindrical lens, which has a predetermined refracting power only in cross section in the vertical scanning (sub-scanning) direction. The collimator lens 2 and the cylindrical lens 3 constitute light guiding means 31 for image recording, which guide the scanning light beam emitted from the semiconductor laser 1 to a light deflector 4.

Numeral 4 represents a light deflector comprising a rotary polygon mirror, which is rotated by driving means (not shown) such as a motor at a constant velocity in the direction of arrow A. Numeral 5 denotes imaging means comprising an f-θ lens having different refracting powers in two orthogonal directions (in the horizontal or main scanning direction, and in the sub-scanning direction), which makes the scanning light beam focused on a surface of a photosensitive drum 6 and which also makes a detecting light beam (second optical beam) for synchronous detection, as will be described later, focused on a surface of a reflection type grating 10. The f-θ lens also guides a part of detecting light beam reflected on reflective portions 10a of the reflection type grating 10 (which is a pulse light signal), as will be described in-detail later, to a deflection facet 4b adjacent to a deflection facet 4a currently used for optical scanning.

Numeral 6 designates a photosensitive drum used as a recording medium, and numeral 7 light source means for synchronous detection (for jitter amount detection) comprising a semiconductor laser, which emits a detecting light beam (second optical beam) to detect a scanning position of the scanning light beam on the surface of the photosensitive drum 6. Numeral 8 denotes a collimator lens, which collimates the detecting light beam emitted from the semiconductor laser 7 to obtain a substantially parallel optical beam. Numeral 9 is a cylindrical lens having a predetermined refracting power only in cross section in the sub-scanning direction. The collimator lens 8 and the cylindrical lens 9 constitute light guiding means 32 for synchronous detection to guide the detecting light beam emitted from the semiconductor laser 7 to the light deflector 4.

In the present embodiment the semiconductor laser (light source means) 7 for synchronous detection is slightly inclined in the sub-scanning direction perpendicular to the main scanning direction with respect to the semiconductor laser (light source means) 1 for image recording. In this arrangement the surface of the reflection type grating 10 disposed in the vicinity of the photosensitive drum 6, as will be detailed later, is scanned with the detecting light beam emitted from the semiconductor laser 7 for synchronous detection. The semiconductor laser (light source means) 7 for synchronous detection is located on a plane of vertical section in the sub-scanning direction including the semiconductor laser (light source means) 1 for image recording.

Figure 2:
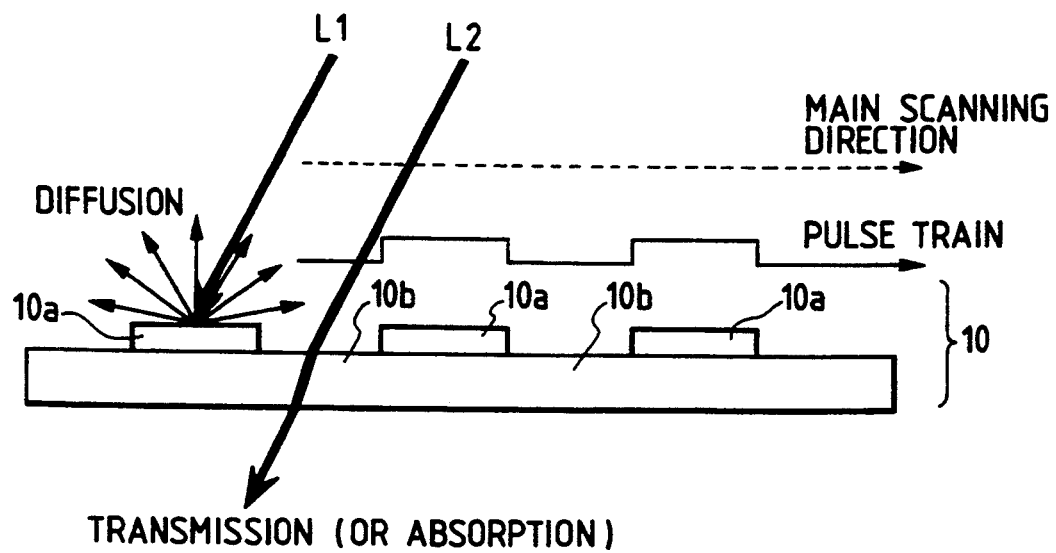
FIG. 2 is an explanatory view to show optical effects of reflection type grating in the first embodiment of the present invention.

Numeral 10 is an optical member comprising a reflection type grating, which is disposed in the vicinity of a surface to be scanned or at a position optically substantially equivalent to the surface of the photosensitive drum 6. In the present embodiment the reflection type grating 10 has reflective portions 10a, each comprising a diffuse reflector, and nonreflective portions (grating lines) 10b which are repeatedly arranged at predetermined intervals in the main scanning direction in which scanning is effected via the light deflector 4 with the optical beam, as shown in FIG. 2. The detecting light beam having passed through the f-θ lens 5 is diffusion-reflected by the reflective portions 10a. A part of thus diffusion-reflected beams is made incident onto the deflection facet 4b adjacent to the deflection facet 4a currently used for optical scanning, by means of the f-θ lens 5.

Numeral 11 is an aperture, which limits with necessity passing beams (light amount) directed from the deflection facet 4b to a photo detector 12. Numeral 12 denotes a photo detector, which detects a light signal (light pulse train) diffusion-reflected by the reflection type grating 10 and passing through the f-θ lens 5, the deflection facet 4b, and the aperture 11. The aperture 11, the f-θ lens 5, and the photo detector 12 constitute light detecting means 30. The f-θ lens 5 also serves as means for image recording and for synchronous detection.

In the present embodiment, when the detecting light beam impinges on a reflective portion 10a of the reflection type grating 10 as shown by L1 in FIG. 2, the detecting light beam is diffusion-reflected at all angles with substantially identical intensity irrespective of an incident angle of the beam. In contrast, when the detecting light beam impinges on a nonreflective portion 10b as shown by L2 in FIG. 2, the detecting light beam is transmitted or absorbed. A stationary ghost light image is obtained from the detection light beam reflected by the reflection type grating 10 and then entering the deflection facet 4b adjacent to the deflection facet 4a of the light deflector 4 currently used for optical scanning. The stationary ghost light image (pulse light signal) is stationary in deflection by the light deflector 4. An intensity of stationary ghost light is detected by the photo detector 12 to obtain a jitter amount from a time change in the signal thus detected.

The aperture 11 is used to keep constant the light amount of stationary ghost light as described.

Without the aperture 11, the light amount of stationary ghost light reaching the photo detector 12 would vary depending upon a change of scanning angle of the light deflector 4.

Further, numeral 50 denotes a control section for controlling the drives of the light source means (semiconductor lasers) 1, 7.

An operation of the present embodiment is next explained. The scanning light beam emitted from the semiconductor laser 1 for image recording is collimated by the collimator lens 2 into a substantially parallel light beam, and the collimated light beam is incident through the cylindrical lens 3 onto the deflection facet 4a of the light deflector 4. The scanning light beam deflected by the deflection facet 4a is guided through the f-θ lens 5 onto the surface of the photosensitive drum 6. In the present embodiment the scanning light beam emitted from the semiconductor laser 1 is optically modulated according to an image signal, and the optical scanning with the thus optically modulated beam is effected by rotating the light deflector 4 in the main scanning direction (in the direction of arrow A in FIG. 1) and rotating the photosensitive drum 6 in the sub-scanning direction (in the direction of arrow B in FIG. 1), whereby the image recording is achieved on the surface of the photosensitive drum 6.

On the other hand, the detecting light beam emitted from the semiconductor laser 7 for synchronous detection is collimated by the collimator lens 8 into a substantially parallel light beam, and the thus collimated light beam is incident through the cylindrical lens 9 onto the deflection facet 4a of the light deflector 4. The detecting light beam is incident onto the deflection facet 4a at a position apart from the scanning light beam at a certain distance in the sub-scanning direction. The detecting light beam deflected by the deflection facet 4a is guided through the f-θ lens 5 onto the reflection type grating 10 to scan the grating 10 in the main scanning direction therewith. A part of light beams diffusion-reflected by the reflective portions 10a of the reflection type grating 10 again enters the f-θ lens 5 and is then made incident onto the deflection facet 4b adjacent to the deflection facet 4a currently used for optical scanning in the form of substantially parallel light beam in plane of main scanning. The detecting light beam deflected by the deflection facet 4b passes through the aperture 11, which limits the passing beams therethrough. The detecting light beam having passed through the aperture 11 is incident again through the f-θ lens 5 into the photo detector 12 to form an stationary ghost spot (stationary ghost image) thereon.

Since the stationary ghost spot is always formed at a constant position irrespective of the deflection angle of the light deflector 4, every light signal (light pulse train) produced in scanning the reflection type grating 10 is detected by the photo detector 12 located at the stationary ghost spot forming position, which is photo-electrically converted to obtain an electric signal.

The electric signal (light pulse train) includes information of jitter of the optical scan apparatus. Specifically, jitter may be obtained as a time change of the electric signal, for example a time change of pulse width, pulse interval, or a pulse number within a constant time. Then, an amount corresponding to such jitter may be detected by the photo detector 12, and the control section 50 produces a synchronizing signal based on the signal thus detected. The control section 50 controls the light emission timing of the scanning light beam emitted from the semiconductor laser 1 for image recording, based on the synchronizing signal, so as to correct the jitter in the optical scan apparatus.

Thus, the photo detecting means 30 of the present embodiment for producing the synchronizing signal may be made smaller in size and reduced in cost of production as compared with the conventional photo detecting means, and the light signal (light pulse train) having information of jitter (unevenness of scanning time) may be detected at a high precision even in the simple arrangement of the photo detector 12 for example comprised of a photo diode in the present embodiment.

Figure 3:
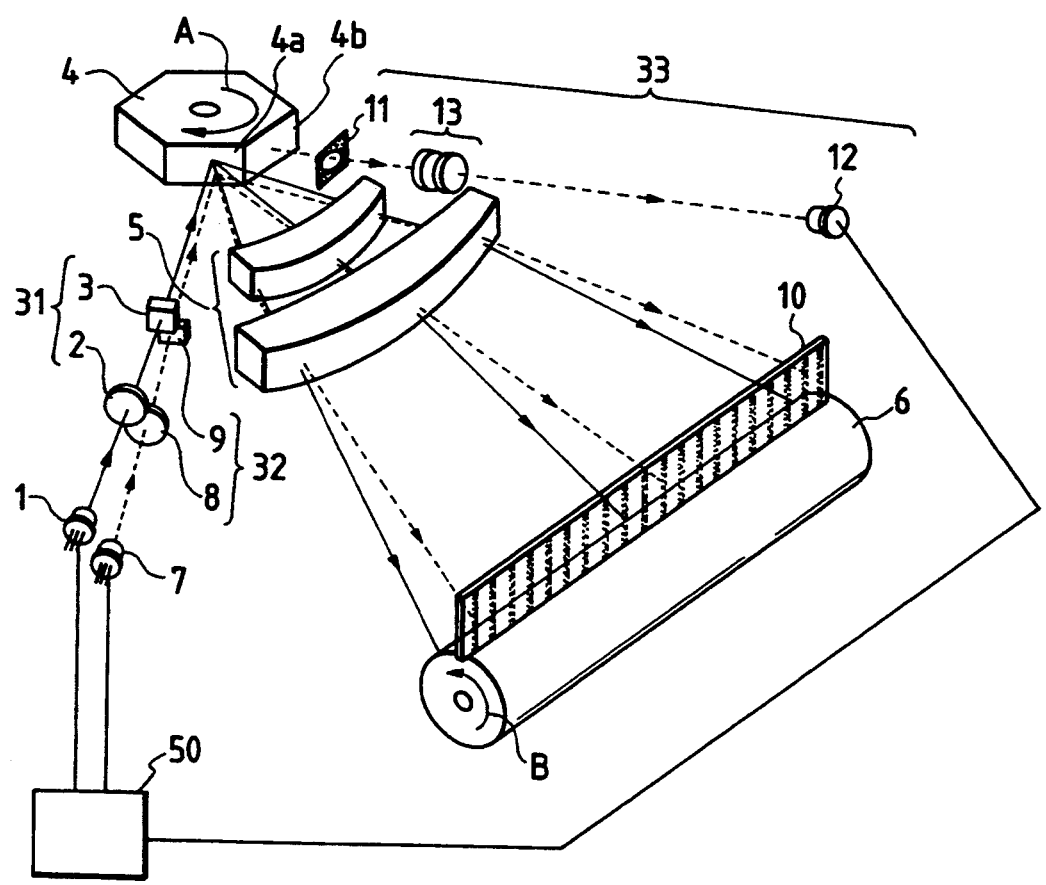
FIG. 3 is a schematic drawing of main part of an optical system in which an imaging lens is added to obtain a ghost spot in the first embodiment of the present invention.

The f-$\theta$ lens 5 is used to form the stationary ghost spot in the present embodiment, while an imaging lens 13 separately disposed from the f-$\theta$ lens 5 may be used as a constituent of the photo detecting means 33 to form the stationary ghost spot in a modification as shown in FIG. 3. The optical system may be so constructed as to avoid an increase in size of the f-$\theta$ lens 5 in the arrangement of this modification.

Additionally, a timing of scan start position on the surface of the photosensitive drum 6 may be controlled at the same time, using the signal from the photo detector 12 in the present embodiment.

In detail, the reflection type grating 10 is scanned with the detecting light beam before the surface of the photosensitive drum 6 is optically scanned with the scanning light beam. The light signal (light pulse train) obtained from the reflection type grating 10 is guided to the deflection facet 4b adjacent to the deflection facet 4a of the light deflector 4 currently used for optical scanning to obtain a timing amount.

The number of pulses in the light pulse train obtained by the photo detector 12 is counted for example by a counter circuit. When the detecting light beam reaches a position equivalent to the scanning start position in scanning based on the information from the counter circuit, the pulse number is a specific value corresponding to a distance from an end of grating to the scan start position.

Thus, whenever the counter circuit counts the specific number of pulses, the scanning is started on the surface of the photosensitive drum 6, whereby the image recording may be carried out without deviation of the scan start position.

In the present embodiment the semiconductor laser 7 for synchronous detection is slightly inclined in the sub-scanning direction with respect to the semiconductor laser 1 for image recording in order to avoid incidence of the detection light beam into the photosensitive drum 6.

Then, the scanning light beam emitted from the semiconductor laser 1 for image recording runs in parallel with the main scanning plane on the surface of the photosensitive drum 6, while the detecting light beam emitted from the semiconductor laser 7 for synchronous detection runs in nonparallel with the main scanning plane on the surface of the reflection type grating 10 so as to cause scanning line bend.

Thus, the reflection type grating 10 must have a length longer in the sub-scanning direction caused by the scanning line bend.

The scanning line bend causes the scan position deviation in the sub-scanning direction on the reflection type grating 10 in the present embodiment, but the scan position of the stationary ghost spot (ghost image) is kept unchanged in the main scanning direction. Therefore, there is no trouble in detection of jitter.

There are the separate light guiding means, one for image recording and the other for synchronous detection, arranged to guide the light beams respectively emitted from the light source means (semiconductor lasers) 1 and 7 to the deflection facet 4a of the light deflector 4 in the present embodiment. Alternatively, single light guiding means (comprising a cylindrical lens and a collimator lens) may be arranged to guide the both light beams emitted from the respective light source means 1, 7.

Figure 4:
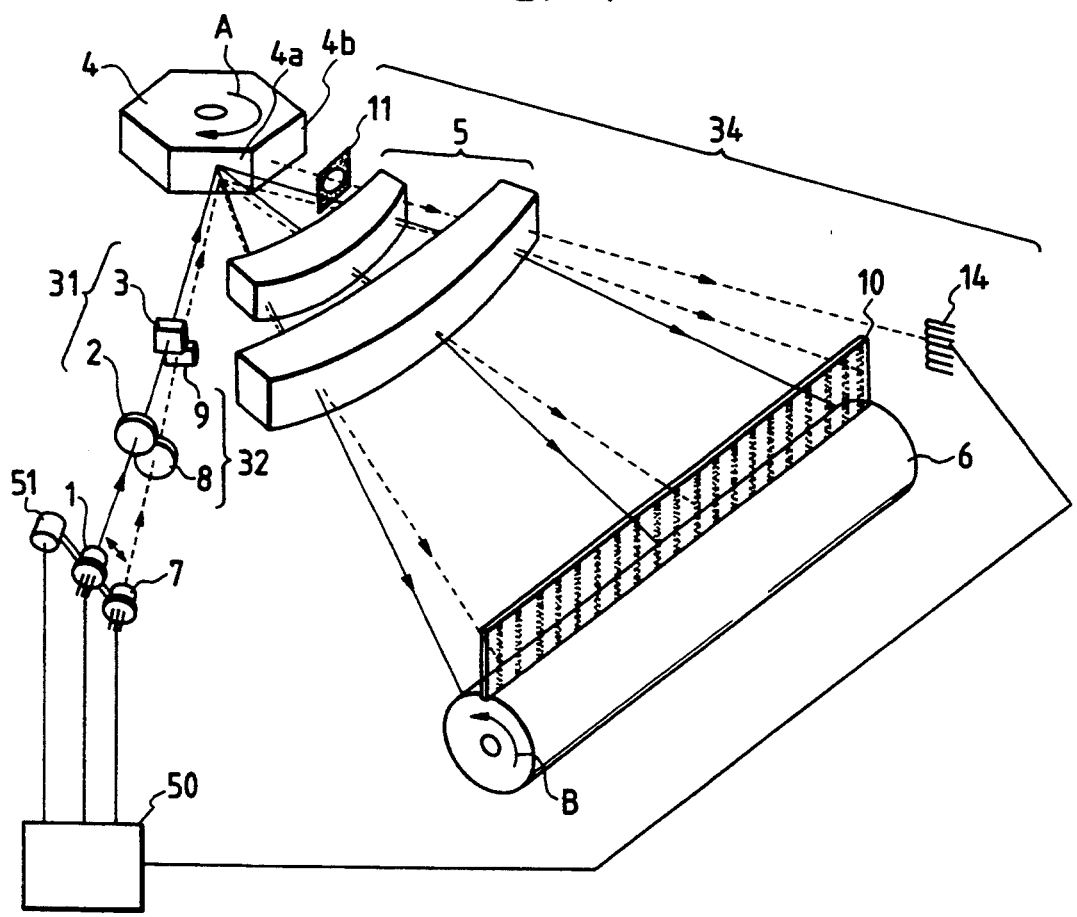
FIG. 4 is a schematic drawing of main part of an optical system in a second embodiment of the present invention.

FIG. 4 is a main part schematic drawing of an optical system in a second embodiment of the present invention. In FIG. 4, the same elements as those in FIG. 1 are denoted by the same reference numerals.

The present embodiment is different from the first embodiment in that the photo detecting means 34 is arranged to simultaneously detect a deviation amount of scanning start position in the sub-scanning direction, which could be caused by vibration of optical components such as the f-$\theta$ lens 5 and the light deflector 4, as well as the jitter amount.

For example, supposing the scan start position (drawing position) is slightly deviated from a desired position in the sub-scanning direction to cause a so-called pitch unevenness because of vibration of the f-$\theta$ lens 5 or the light deflector 4, a formation position of stationary ghost spot is also slightly deviated in the sub-scanning direction with the pitch unevenness.

Figure 5:
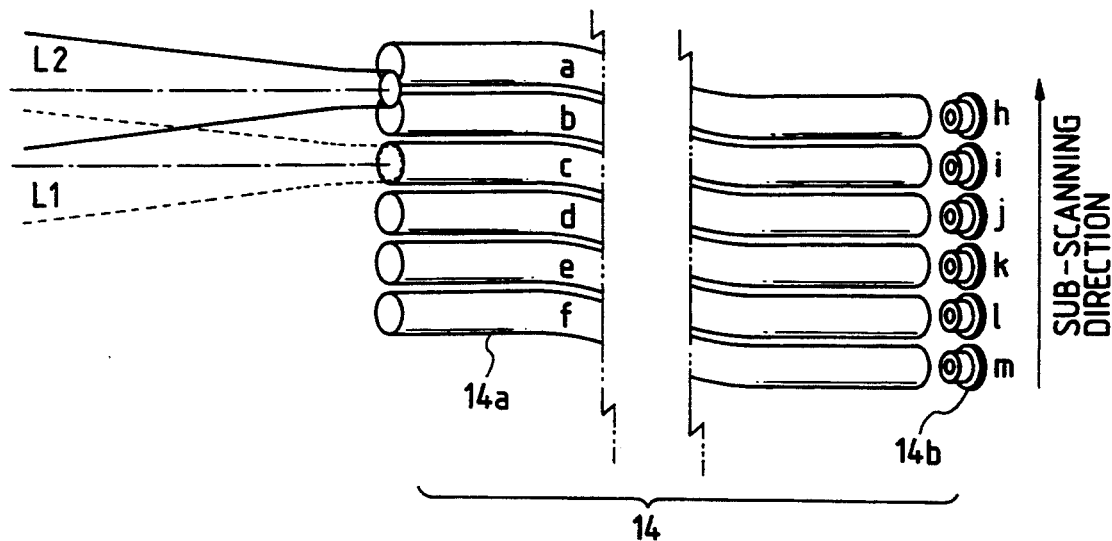
FIG. 5 is an explanatory view of a photo detector in the second embodiment of the present invention.

Then, the photo detector 14 in the present embodiment is composed of an optical fiber series 14a and a photo detector series 14b as shown in FIG. 5, as capable of detecting both the pitch unevenness amount and the jitter amount.

In FIG. 5 the photo detector 14 is arranged to comprise a combination of plural optical fibers a, b, . . . aligned in the sub-scanning direction with plural photo detectors h, i, . . . each for detecting and amount of incident light into each optical fiber, in which the jitter amount and the pitch unevenness amount are detected using output signals of the photo detectors.

For example, the stationary ghost light L1 is preliminarily adjusted to converge at (enter) the optical fiber c with no pitch unevenness in the sub-scanning direction as shown in FIG. 5. A signal value output from the corresponding photo detector j is set as a reference value.

Suppose pitch unevenness causes the stationary ghost light L1 to move to ghost light L2, the stationary ghost light L2 converges at the optical fiber series a, b, whereby the ghost light enters the photo detectors h, i connected with the optical fiber series a, b. Then an output value from the photo detector j is decreased below the reference value. In the present embodiment a comparator compares the outputs of the photo detectors h, i with the reference value thereby to detect an amount of pitch unevenness, so that the pitch unevenness in the sub-scanning direction may be corrected by moving the light source means (semiconductor lasers) 1, 7 in the sub-canning direction through correcting means 51 by the control section 50.

Further, the measurement of jitter amount may be carried out using the electric signal (light pulse train) detected by the respective photo detectors and based on the reflection type grating.

As described, the pitch unevenness caused by vibration of optical components such as the f-$\theta$ lens and the light deflector may be detected at a high precision, using the photo detector 14 comprising the optical fiber series 14a and the photo detector series 14b in the present embodiment.

Also, the same effects and advantages as in the second embodiment may be attained in such a modification that the photo detector series 14b is directly located at the position of stationary ghost spot without using the optical fiber series 14a. This modification permits simplification and cost reduction of photo detector.

Figure 6:
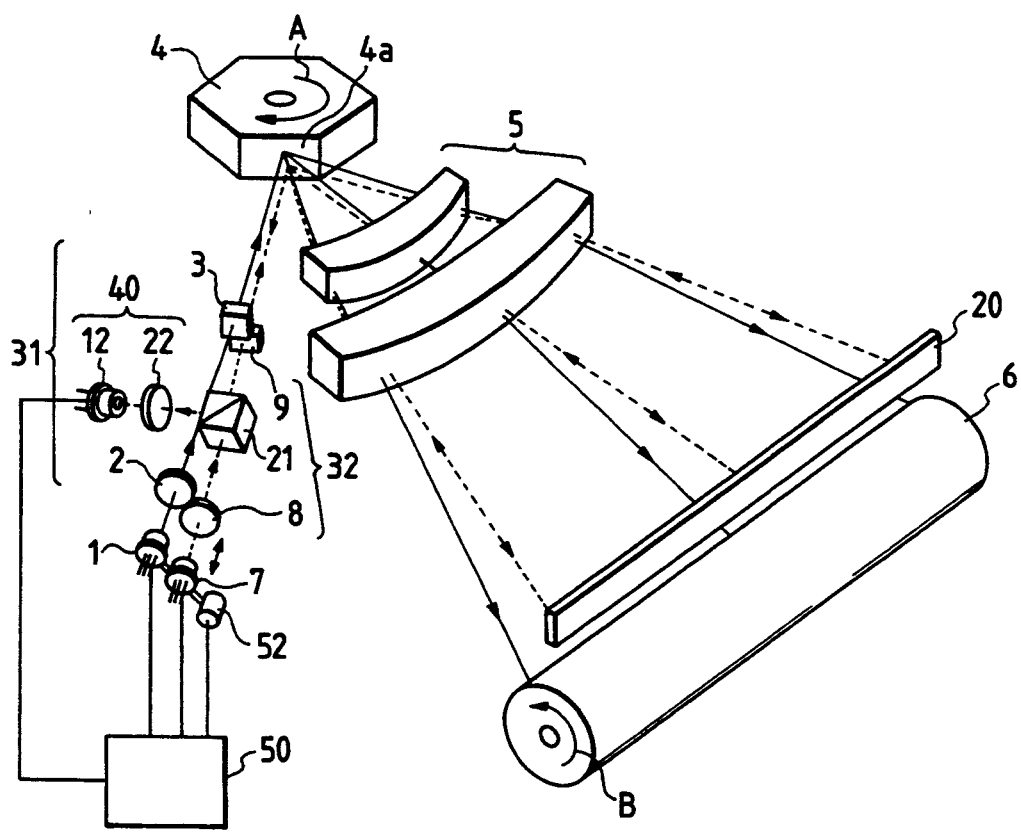
FIG. 6 is a schematic drawing of main part of an optical system in a third embodiment of the present invention.

FIG. 6 is a main part schematic drawing of an optical system in a third embodiment of the present invention. In FIG. 6, the same elements as those in FIG. 1 are denoted by the same reference numerals.

The third embodiment is different from the first embodiment in that the optical member for producing the pulse light signal is a corner cube array 20 with a plurality of micro corner cubes (reflective portions) 20a, 20b, ..., as will be described with FIG. 7, being aligned at a certain pitch in the main scanning direction in which the light deflector 4 makes the light beam running for scan, the detecting light beam (light signal) reflected by the corner cube array 20 returns via a deflection facet 4a which is the same facet as a deflection facet 4a currently used for optical scanning, to light guiding means 32 for synchronous detection, and the detecting light beam is then guided through a half mirror 21, which is a constituent of the light guiding means 32, to photo detecting means 40 comprising a condenser lens 22 and a photo detector 12. The other construction is generally the same as in the first embodiment.

Figure 7:
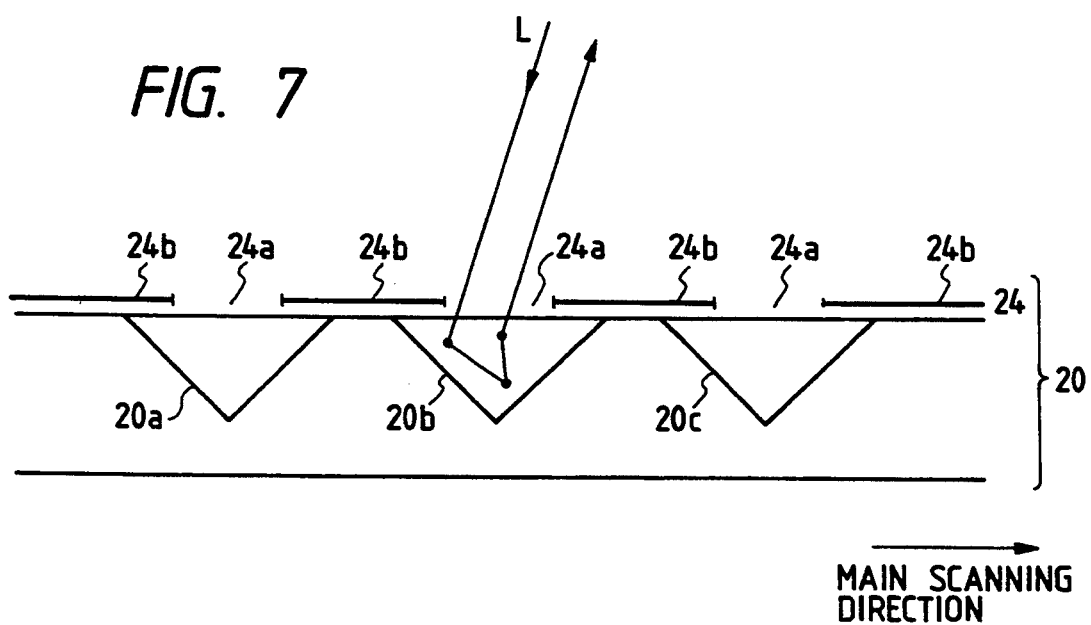
FIG. 7 is an explanatory view to show a structure of a corner cube array in the third embodiment of the present invention.

FIG. 7 is a fragmentary enlarged drawing to show the construction of corner cube array 20 in the present embodiment.

In FIG. 7, numeral 20 is a corner cube array, in which micro corner cubes (reflective portions) 20a, 20b, 20c, ... are aligned in the main scanning direction and in which an aperture array 24 having repetitive opening portions 24a and shielding portions (nonreflective portions) 24b is disposed in front of the corner cubes 20a, 20b, 20c, etc. Each of the micro corner cubes 20a, 20b, 20c, etc. is made of optical glass or of a plastic as a prism having three orthogonal planes.

In the present embodiment, the detecting light beam emitted from the semiconductor laser 7 for synchronous detection (jitter amount detection) is guided through the collimator lens 8, the half mirror 21, and the cylindrical lens 9 to the deflection facet 4a of the light deflector 4, and the detecting light beam is then deflected by the facet plane 4a to pass through the f-θ lens 5 to scan the surface of the corner cube array 20 in the main scanning direction therewith.

In FIG. 7, for example if the detecting light beam L having passed through the f-θ lens (not shown in FIG. 7) passes through an opening portion 24a of the aperture array 24 and then enters for example a micro corner cube 20b, the detecting light beam L is reflected three times by the reflective planes of the micro corner cube 20b as shown in FIG. 7, and the reflected beam leaves the micro corner cube 20b at an angle which is the double of angle of deviation of prism under the principle of three mirrors, in the incident direction.

The detecting light beam (pulse light signal) reflected by the reflective portions 20a, 20b, 20c, ... of the corner cube array 20 is guided again through the f-θ lens 5, and the detecting light beam is then reflected by the deflection facet 4a currently used for optical scanning toward the semiconductor laser 7 for synchronous detection. The detecting light beam is then guided through the cylindrical lens 9 to be collimated into a substantially parallel light beam, and the collimated beam is then bent by the half mirror 21 toward the condenser lens 22 to converge and form a spot on the surface of the photo detector 12.

There is no reflected light produced when the detecting light beam L moves on the shielding portions 24b of the aperture array 24. A pulse light signal is produced in scanning the corner cube array 20 with the detecting light beam accordingly. The pulse light signal (detecting light beam) obtained in scanning the corner cube array 20 is guided to the photo detector 12 to be subjected to the photo-electric conversion, whereby an electric signal (light pulse train) as shown in either of FIGS. 8A–8C may be obtained from the photo detector 12.

With no jitter, an output signal (output wave form) is obtained without deviation of pulse width or pulse spacing, as shown in FIG. 8A. With jitter, an output signal has a pulse width and a pulse spacing changed as shown by the solid line in FIG. 8B. FIG. 8B also shows the output signal in case of no jitter by the broken line.

In the present embodiment the jitter amount is detected by detecting information such as the pulse width and the pulse spacing of the output signal or a time of addition thereof, and a synchronizing signal is produced by the control section 50, based on the information of jitter amount thus detected. An optical scan apparatus without jitter is obtained by controlling the light emission timing of the scanning light beam emitted from the semiconductor laser 1 for image recording, based on the synchronizing signal.

The converged spot of detecting light beam converged on the surface of the photo detector 12 is always formed at a constant position irrespective of the deflection angle of the light deflector 4, so that every light signal (light pulse train) produced by scanning the corner cube array 20 is detected by the photo detector 12 disposed at the position of converged spot then to be subjected to the photo-electric conversion, whereby the synchronizing signal may be produced from the electric signal thus converted.

Such an arrangement permits the photo detecting means 40 to be made smaller as compared with the conventional photo detecting means. For example, the light signal (light pulse train) having information of jitter (unevenness of scan time) may be optically detected by a photo detector 12 comprised of a single photo diode.

Although the optical member 20 is constituted using prisms in the present embodiment, the prisms may be replaced by mirrors each having three reflection planes orthogonal to one another. Such an optical member 20 is also called as the corner cube array in the present embodiment.

In case that the optical member 20 is formed with mirrors, a series of recesses having three orthogonal reflection planes would be formed on a substrate and a metal such as aluminum or copper would be vaporized to deposit on the series of recesses.

The present embodiment also permits the control of timing of scan start position on the surface of the photosensitive drum 6 in the same manner as in the first embodiment.

In detail, the corner cube array 20 is scanned with the detecting light beam before the photosensitive drum 6 surface is optically scanned with the scanning light beam, the light signal (light pulse train) obtained by the corner cube array 20 is guided to the photo detector 12 to detect a jitter amount, and a timing of scan start position is adjusted on the surface of photosensitive drum 6 by correction amount of jitter. Then, the image recording may be carried out without deviation of scan start position on the surface of photosensitive drum 6.

Also in the present embodiment, while the jitter amount as described is detected using the output signal from the photo detector 12, a focus condition is detected at the same time to obtain an output image in focus.

For example, if the focal point is deviated, a diameter of scan spot becomes larger on the surface of photosensitive drum 6. Specifically, the output signal from the photo detector 12 increases its rise time and fall time. For example, an output signal from the photo detector 12 with the focal point being deviated has a dull wave form with gentle slope of rise and fall as shown in FIG. 8C.

The present embodiment uses the output signal from the photo detector 12 to enable autofocus by feed-back of the information obtained by the photo detector 12 to a focus control mechanism 52 through the control section 50 so that the rise and fall wave form in output signal is always kept sharp, that is, so that the rise time and the fall time are kept short. This arrangement permits one to obtain an output image always in focus. In this arrangement, the light source means (semiconductor lasers) 1, 7 are moved by the focus control mechanism 52 in the direction of optical axis to effect the autofocus.

Although the optical scan apparatus is so arranged in the present embodiment that two separate sets of collimator lens and cylindrical lens, one for image recording and the other for synchronous detection, are provided as the optical members for guiding the light beams emitted from the respective light source means (semiconductor lasers) 1, 7 to the light deflector 4, a single set of collimator lens and cylindrical lens may be employed for guiding the two light beams, as described in the first embodiment. Such a modification may permit a reduction in number of components.

The thus arranged light guiding means increases a possibility of noise light of scanning light beam reflected by the photosensitive drum 6 surface and entering the photo detector 12, but the light amount of scanning light beam is considerably lower than the light amount of detecting light beam reflected by the corner cube array 20 as to cause no big problem in measuring jitter.

According to the present invention as described, the optical member having the reflective portions and the nonreflective portions is disposed in the vicinity of the surface to be scanned or at a position optically substantially equivalent to the surface to be scanned, and the pulse light signal obtained in scanning the optical member with the detecting light beam is guided through the deflection facet of light deflector to the photo detecting means, whereby the photo detecting means may be made smaller in size and the jitter amount may be detected at a high precision so as to obtain an optical scan apparatus without jitter, and whereby an optical scan apparatus is attained with the jitter amount measuring means which can adjust in timing of scan start position on the surface to be scanned and which can also detect the focus condition.

What is claimed is:

1. A scan optical apparatus comprising:
 a first light source for generating a beam for scan optically modulated based on an image signal;
 a second light source for generating a beam for jitter amount detection;
 multi-faceted scanning means for deflecting said beams from said first light source and from said second light source toward a surface to be scanned;
 an optical member disposed in the vicinity of said surface to be scanned or at a position substantially optically equivalent to said surface to be scanned, said optical member having a reflective portion and a nonreflective portion; and
 detecting means for detecting a beam reflected by said optical member and subsequently deflected by said scanning means, wherein a first facet of said scanning means which deflects the beam reflected by said optical member is adjacent a second facet of said scanning means which deflects said beams from said first and second light sources towards said surface to be scanned.

2. A scan optical apparatus according to claim 1, wherein a jitter amount is detected based on a signal obtained by said detecting means.

3. A scan optical apparatus according to claim 1, wherein the reflective portion of said optical member comprises a diffuse reflector.

4. A scan optical apparatus comprising:
 a first light source for generating a beam for scan optically modulated based on an image signal;
 a second light source for generating a beam for jitter amount detection;
 scanning means for deflecting said beams from said first light source and from said second light source toward a surface to be scanned;
 an optical member disposed in the vicinity of said surface to be scanned or at a position substantially optically equivalent to said surface to be scanned, said optical member being a corner cube array in which a plurality of corner cubes are arranged in a main scan direction; and
 detecting means for detecting a beam reflected by said optical member and subsequently deflected by said scanning means.

5. A scan optical apparatus according to claim 4, wherein a jitter amount is detected based on a signal obtained by said detecting means.

6. A scan optical apparatus according to claim 4, wherein a focus condition of the beam from said first light source is detected on said surface to be scanned based on a signal obtained by said detecting means.

7. A recording apparatus comprising:
 a first light source for generating a beam for scan optically modulated based on an image signal;
 a second light source for generating a beam for jitter amount detection;
 a recording medium;
 multi-faceted scanning means for deflecting said beams from said first light source and from said second light source toward said recording medium;
 an optical member disposed in the vicinity of said recording medium or at a position substantially optically equivalent to said recording medium, said optical member having a reflective portion and a nonreflective portion; and
 detecting means for detecting a beam reflected by said optical member and subsequently deflected by said scanning means, wherein a first facet of said scanning means which deflects the beam reflected by said optical member is adjacent a second facet of said scanning means which deflects said beams from said first and second light sources towards said recording medium.

8. A recording apparatus according to claim 7, wherein a jitter amount is detected based upon a signal obtained by said detecting means.

9. A recording apparatus according to claim 7, wherein the reflective portion of said optical member comprises a diffuse reflector.

10. A recording apparatus comprising:
a first light source for generating a beam for scan optically modulated based on an image signal;
a second light source for generating a beam for jitter amount detection;
a recording medium;
scanning means for deflecting said beams from said first light source and from said second light source toward said recording medium;
an optical member disposed in the vicinity of said recording medium or at a position substantially optically equivalent to said recording medium, said optical member being a corner cube array in which a plurality of corner cubes are arranged in a main scan direction; and
detecting means for detecting a beam reflected by said optical member and subsequently deflected by said scanning means.

11. A recording apparatus according to claim 10, wherein a jitter amount is detected based on a signal obtained by said detecting means.

12. A recording apparatus according to claim 10, wherein a focus condition of the beam from said first light source is detected on said recording medium based on a signal obtained by said detecting means.

13. A method for scanning using an optical scanning apparatus, comprising the steps of:
scanning a scanning surface with a first beam and an optical member with a second beam using a common multi-faceted scanning element, said first beam being optically modulated based on an image signal;
reflecting said second beam off said optical member to provide a reflected beam;
deflecting said reflected beam off a first facet of said scanning element to provide a deflected beam, said first facet being adjacent a second facet of said scanning element which scans said first and said second beams; and
detecting said deflected beam.

14. The method of claim 13, further comprising the step of determining jitter in said apparatus based on said deflected beam.

15. The method of claim 14, further comprising the step of adjusting said first beam to reduce jitter.

16. The method of claim 13, wherein said reflecting step comprises reflecting off a diffuse-reflection surface of said optical element.

17. A method for scanning using a scanning optical apparatus, comprising the steps of:
scanning a scanning surface with a first beam and an optical member with a second beam using a common scanning element, said first beam being optically modulated based on an image signal;
reflecting said second beam off a corner cube array to provide a reflected beam, said corner cube array being disposed in the vicinity of said scanning surface or at a position substantially optically equivalent to said scanning surface;
deflecting said reflected beam off said common scanning element to provide a deflected beam; and
detecting said deflected beam.

18. The method of claim 17, wherein said reflecting step comprises reflecting off a corner cube array arranged in a main scanning direction.

19. The method of claim 17, further comprising the step of determining jitter in said apparatus based on said deflected beam.

20. The method of claim 19, further comprising the step of adjusting said first beam to reduce jitter in said apparatus.

21. The method of claim 17, further comprising the steps of determining a focus condition on the basis of said deflected beam detected in said detecting step, and adjusting said first beam to improve focus of said first beam on said scanning surface based on said focus condition so determined.

22. A method of recording using a recording apparatus, comprising the steps of:
scanning a recording medium with a first beam optically modulated based on an image signal to effect recording, and an optical member with a second beam to determine jitter in said first beam, said scanning step being effected using a common multi-faceted scanning element;
reflecting said second beam off said optical member to provide a reflected beam;
deflecting said reflected second beam off a first facet of said scanning element to provide a deflected beam, said first facet being adjacent a second facet of said scanning element which scans said first and said second beams; and
detecting said deflected beam.

23. The method of claim 22, further comprising the step of determining jitter in said apparatus based on said deflected beam.

24. The method of claim 23, further comprising the step of adjusting said first beam to reduce jitter in said recording apparatus.

25. The method of claim 22, wherein said reflecting step comprises reflecting off a diffuse-reflection surface of said optical element.

26. A method for recording in a recording apparatus, comprising the steps of:
scanning a recording medium with a first beam to effect recording and an optical member with a second beam using a common scanning element, said first beam being optically modulated based on an image signal;
reflecting said second beam off a corner cube array to provide a reflected beam, said corner cube array being disposed in the vicinity of said recording surface or at a position substantially optically equivalent to said recording surface;
deflecting said reflected beam to provide a deflected beam; and
detecting said deflected beam.

27. The method of claim 26, wherein said reflecting step comprises reflecting off a corner cube array arranged in a main scanning direction.

28. The method of claim 26, further comprising the step of determining jitter in said apparatus based on said deflected beam.

29. The method of claim 28, further comprising the step of adjusting said first beam to reduce jitter in said recording apparatus.

30. The method of claim 26, further comprising the steps of determining a focus condition on the basis of said deflected beam detected in said detecting step, and adjusting said first beam to improve focus of said first beam on said recording medium based on said focus condition so determined.

31. A recording apparatus, comprising:
a first light source for generating a first beam, said first beam being modulated based on an input image signal;
a second light source for generating a second beam;
a light-sensitive recording medium;
an optical member adjacent said recording medium, said optical member having a reflective section and a nonreflective section;
a scanning means for deflecting said first beam towards said recording medium so as to effect recording by said first beam, and for deflecting said second beam towards said optical member;
wherein said second beam is reflected by said reflective section of said optical member towards said scanning means, said reflected beam being indicative of jitter in said apparatus;
a detector for receiving said reflected beam upon deflection of said reflected beam by said scanning means, said detector providing a signal indicative of jitter in said apparatus; and
a controlling element for receiving said signal and for adjusting said first beam based on said signal so as to reduce jitter.

32. The apparatus of claim 31, wherein said second light source is inclined relative to said first light source.

33. The apparatus of claim 31, wherein said detector comprises a plurality of photodetectors and a comparator, said photodetectors and said comparator being used to provide a second signal indicating pitch unevenness in said first beam.

34. The apparatus of claim 33, wherein said second signal is provided to said control element for reducing pitch unevenness in said first beam.

35. The apparatus of claim 33, wherein said detector further comprises a plurality of optical fibers.

36. The apparatus of claim 35, wherein said second signal is provided to said control element for reducing pitch unevenness in said first beam.

37. The apparatus of claim 31, wherein said optical member is a corner cube array.

38. The apparatus of claim 37, further comprising an adjustable focus mechanism for focusing said first beam on said recording medium, wherein said signal is also indicative of a focus condition of said first beam and wherein said controlling element controls focus of said focus mechanism based on said signal.

* * * * *

UNITED STATES PATENT AND TRADEMARK OFFICE
CERTIFICATE OF CORRECTION

PATENT NO. : 5,371,608
DATED : December 6, 1994
INVENTOR(S) : Kenji Muto, et al

It is certified that error appears in the above-indentified patent and that said Letters Patent is hereby corrected as shown below:

On the cover page: Item [73], under "References Cited", insert the following:

FOREIGN PATENT DOCUMENTS

2-106715    4/90    Japan
2-277018    11/90   Japan

OTHER DOCUMENTS

G. Toyen, "Generation Of Precision Pixel Clock In Laser Printers And Scanners", SPIE Vol. 84 Laser Scanning Components & Techniques (1976), pp. 138-145.

Signed and Sealed this

Twenty-fifth Day of April, 1995

Attest:

BRUCE LEHMAN

*Attesting Officer*     *Commissioner of Patents and Trademarks*